March 17, 1931. C. DOERING ET AL 1,796,445
CONTINUOUS CHEESE PROCESSING MACHINE
Filed Sept. 22, 1927 5 Sheets-Sheet 5
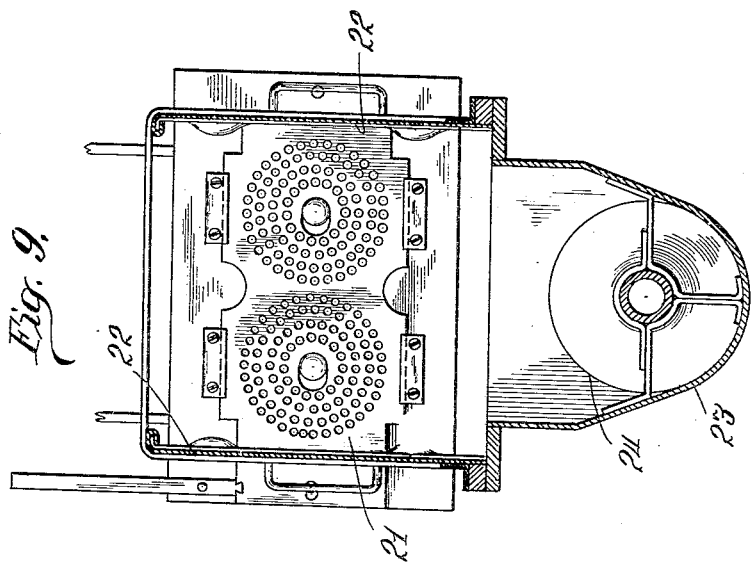
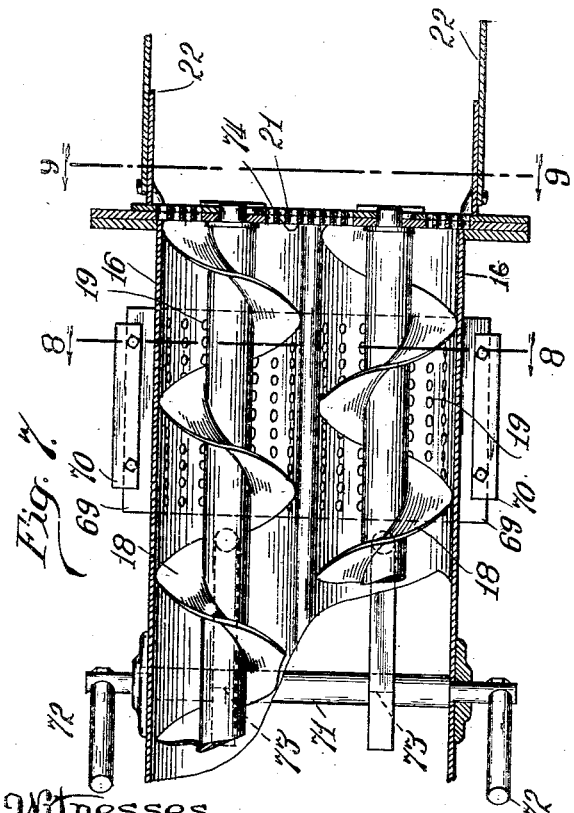
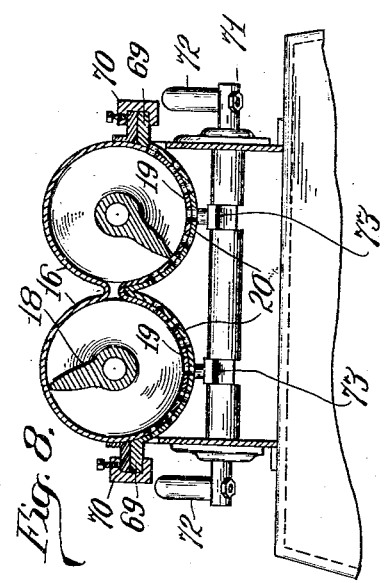

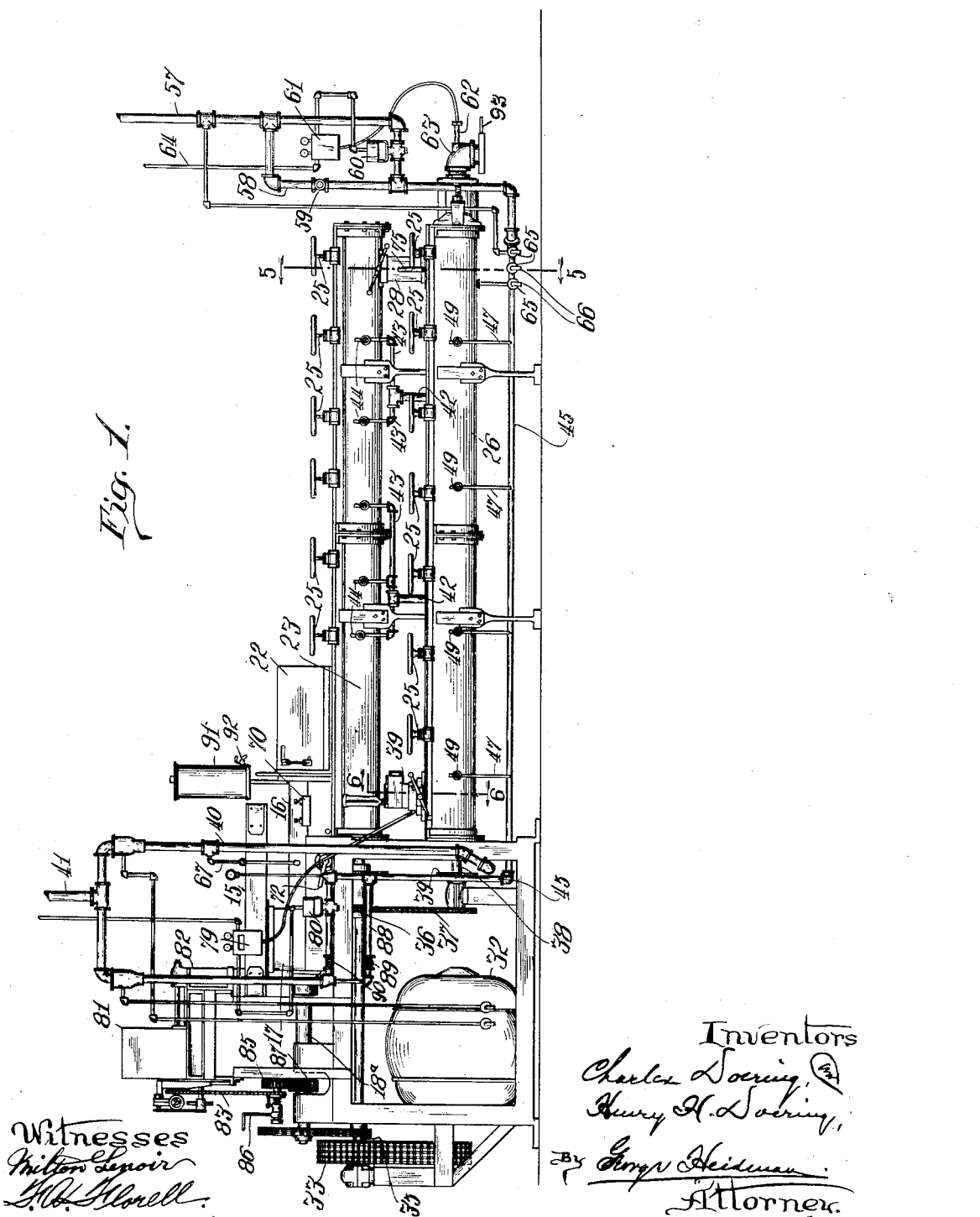

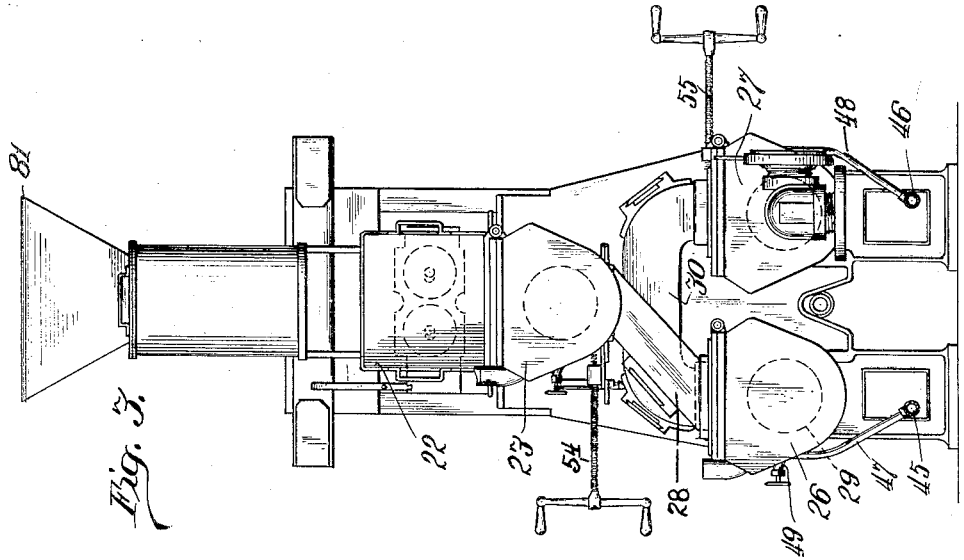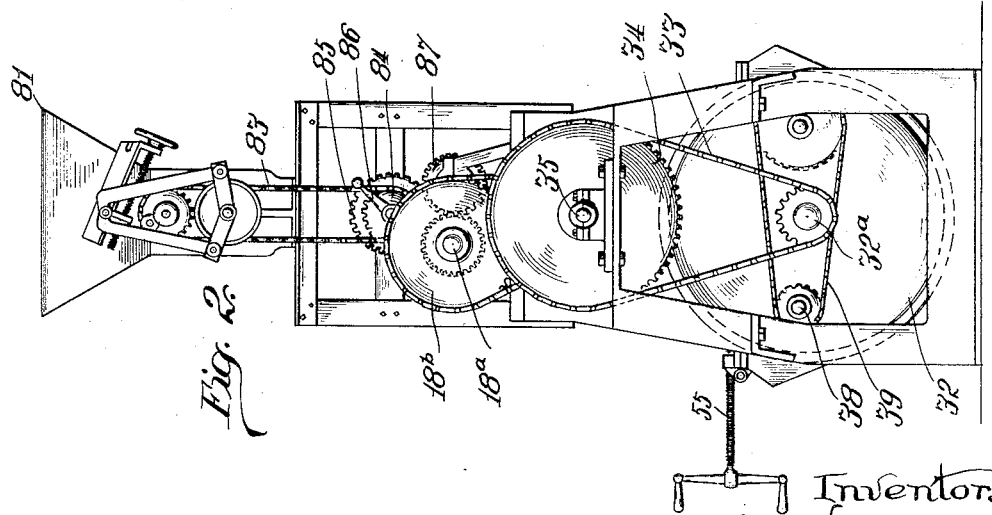

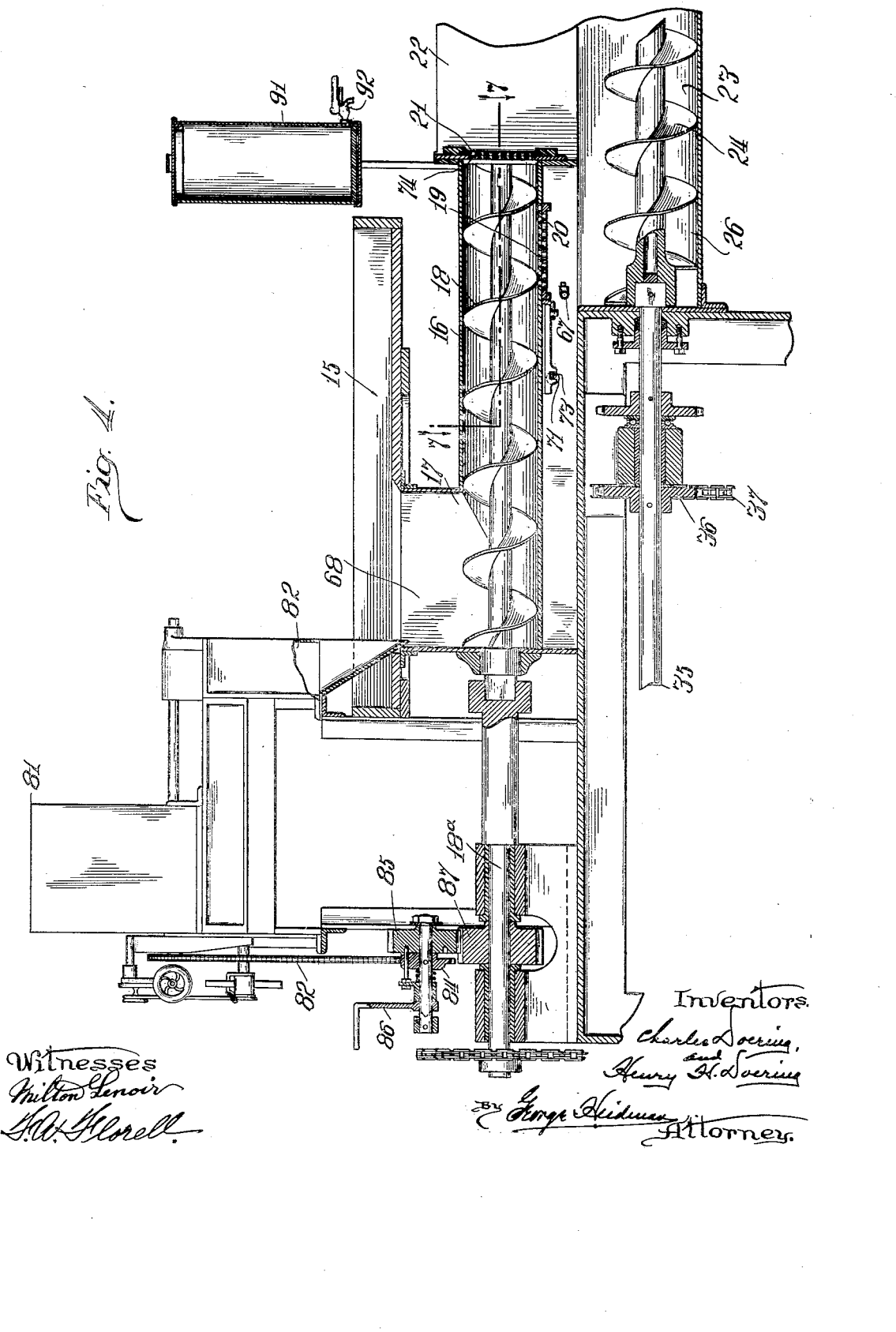

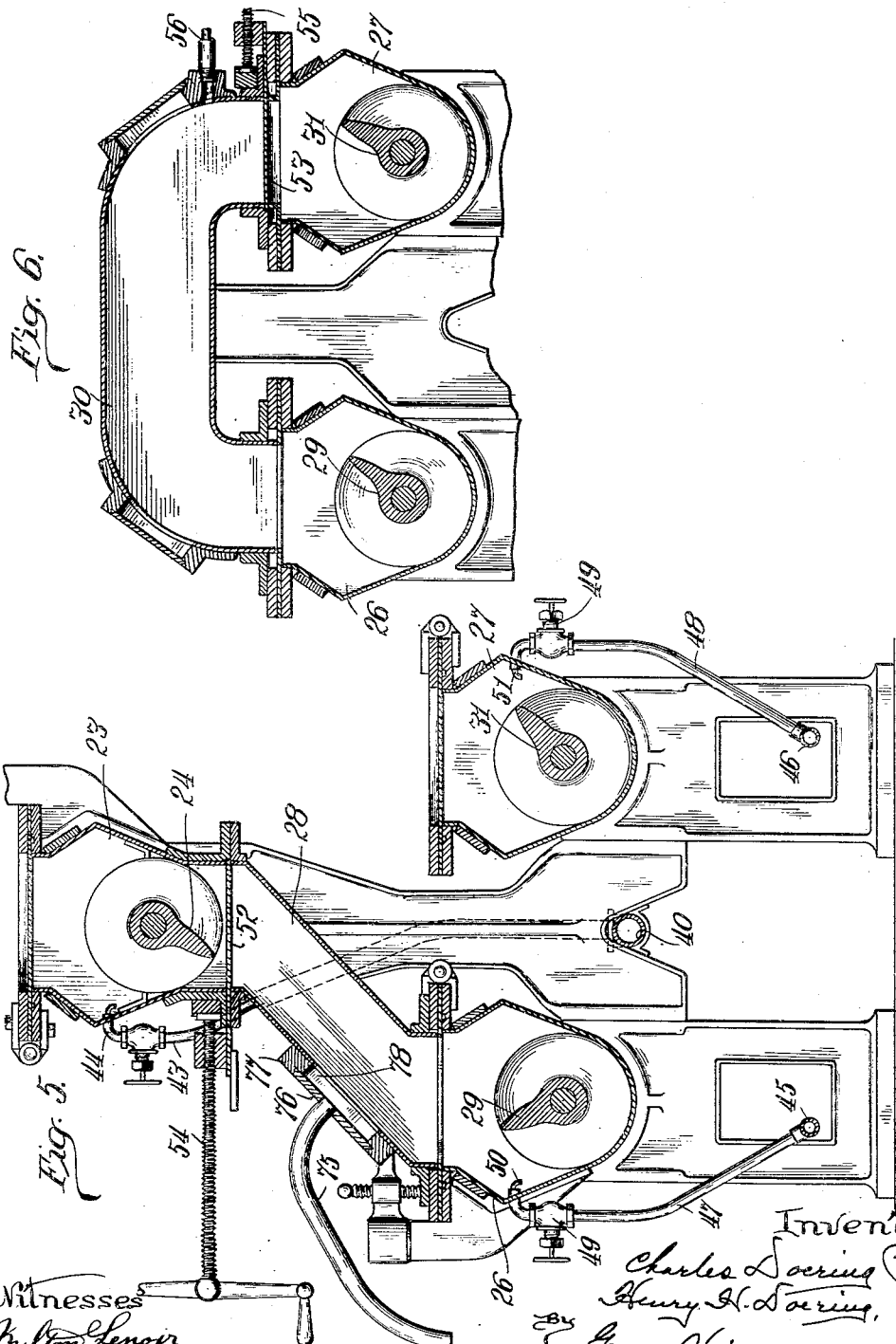

Patented Mar. 17, 1931

1,796,445

UNITED STATES PATENT OFFICE

CHARLES DOERING AND HENRY H. DOERING, OF CHICAGO, ILLINOIS

CONTINUOUS CHEESE-PROCESSING MACHINE

Application filed September 22, 1927. Serial No. 221,204.

Our invention relates to a machine for processing cheese by a continuous operation; the invention having for its object the provision of a machine whereby the treatment or processing operation is entirely accomplished by mechanical means thus not only enabling a greater quantity per unit of time to be processed, in a more sanitary manner, but a cheese of different and more uniform texture and superior quality produced than has heretofore been the case; the treatment or processing being carried on in enclosed chambers and without contact with human hands.

The machine produces a sterilized cheese containing the desired butter-fats or vegetable oils and any suitable flavoring ingredient all of which are mechanically introduced in predetermined and uniform quantities.

Our invention contemplates a machine wherein the processing or cooking of the cheese is carried on in a series of closed chambers by the introduction of steam at a suitable pressure; the chambers, except at the receiving or charging end, being entirely closed; being made elongated and arranged in communication with each other so as to provide a continuous path of predetermined length through which the cheese mass is made to travel under pressure, the cheese being cooked at a higher temperature than has heretofore been the case, while at the same time producing a cheese product having the desired quality and texture.

The invention and its object, as well as the advantages of the construction, will be more readily comprehended from the detailed description of the drawings, wherein—

Figure 1 is a side elevation of our improved machine.

Figure 2 illustrates the front end in elevation.

Figure 3 is an elevation of the rear or delivery end thereof.

Figure 4 is a central sectional view of the front or charging end of the machine and portions of the first processing chamber.

Figure 5 is a vertical sectional view taken on the line 5—5 of Figure 1 looking in the direction of the arrows.

Figure 6 is a detail sectional view taken on the line 6—6 of Figure 1 looking in the direction of the arrows.

Figure 7 is a detail sectional view taken on the line 7—7 of Figure 4 looking in the direction of the arrows.

Figure 8 is a detail sectional view taken on the line 8—8 of Figure 7 looking in the direction of the arrows.

Figure 9 is a detail view taken on the line 9—9 of Figure 7 looking in the direction of the arrows.

Our improved processing machine, as exemplified in the drawings, comprises a plurality of separate chambers through which the cheese is progressively made to travel. The initial or receiving end is shown provided with the cheese receiving tray or table 15 arranged above the cheese grinder and compressor portion consisting peferably of the practically closed (except at the initial end) double trough 16, 16 provided with the feed-hopper or chute 17. The cheese, which preferably has been previously broken or cut into small pieces or chunks, is brought or fed to the tray 15 in any suitable manner and thence fed into the elongated chambers 16, (arranged in communication with each other as shown in Figure 8) which are each provided with a worm or screw 18 whereby the cheese is caused to travel toward the opposite end of the chambers 16. The opposite or delivery end of each trough 16 is provided with a perforated bottom 19 adjacent to which is mounted a perforated slide plate 20 for the purpose of regulating the size of the openings and therefore the fineness of the cheese particles delivered from chambers or troughs 16 into the remaining portion of the processing machine. The end walls of the troughs 16, 16 are also perforated and a perforated plate 21 slidably mounted adjacent thereto. The perforated plate 21 is shown provided with slots to receive the ends of the worm-screws 18; the slots permitting endwise movement or adjustment of plate 21 so that the perforations of the plate and end walls may be partially moved out of entire register and the size of the cheese passages therethrough regulated and thus the fineness of the cheese controlled.

The end of the grinding portion, consisting of troughs 16, 16, is provided with a housing or side walls at 22; the bottom of this housing 22, as well as the bottom at the delivery ends of the troughs 16, 16 having the perforations communicate with the receiving end of the closed elongated initial cooking chamber 23 which is provided with a screw or conveyor 24 extending lengthwise thereof. The chamber 23, with the exception of the initial receiving end, is closed by means of a suitable cover plate or cover plates controlled by suitable clamp members 25.

Disposed lengthwise of chamber 23, preferably in a plane therebeneath, are a pair of additional chambers 26 and 27 shown arranged in parallel side by side relation, see Figures 2, 3 and 5. The end of chamber 26, adjacent to the rear or delivery end of chamber 23, has communication with chamber 23 by means of the downwardly sloping conduit or connection 28. Chamber 26 is also closed throughout its entire length by means of suitable cover plates, held in closed position by means of clamps 25. The chamber 26 is provided with a feed screw 29 arranged to rotate in reverse direction to that of feed-screw 24 in chamber 23 so as to cause the cheese to travel toward the other end of chamber 26 located beneath the initial end of chamber 23, where chamber 26 is provided with a connection or conduit 30 for effecting communication between chamber 26 and the adjacent end of chamber 27, see Figure 6. Chamber 27 is also closed throughout its length, being provided with suitable cover plates secured in place by clamps 25. The chamber is provided with a feed-screw 31 adapted to feed the cheese being processed toward the opposite or rear end of the machine; that is to say, the feed-screw 31 of chamber 27 induces the cheese to travel in the same direction as the screw 24 in chamber 23.

Any suitable motive power may be employed for rotating the feed-screws, as for example an electric motor shown at 32, whose armature shaft 32ª is shown provided with a silent chain 33 which operates sprocket wheel 34 secured on drive shaft 35 which has direct connection with worm 24 of chamber 23. Shaft 35 is provided with a sprocket 36 having sprocket chain 37 which drives shaft 38 which controls the feed-screw 31 in chamber 27; and shaft 38 is operatively connected, as for example by chain 39, with the shaft which operates the worm 29 in chamber 26.

The machine is provided with a steam line 40 disposed lengthwise thereof and having communication with a suitable source of steam supply, namely with the steam line 41. The steam line 40 at suitable points is provided with pipes 42 whose upper ends are provided with suitable ramifications or branches 43 each provided with valve controlled jets or nozzles 44 for introducing steam into chamber 23 at various points throughout its length rearward of the initial cheese charging end thereof. The main steam supply line 41 also supplies steam to steam line shown disposed lengthwise of the machine.

The steam lines 45 and 46 are each provided, at suitable points, with branch lines 47 and 48, respectively, the upper ends whereof are provided with suitable control valves 49 in advance of the injector nozzles or jets 50 and 51, respectively. That is to say, the branch lines 47 lead to nozzles 50 disposed at suitable points throughout the length of the chamber 26 for injecting steam into the mass of cheese passing through said chamber; while the branch lines 48 convey steam to the nozzles or jets 51 for introducing steam into the chamber 27 at various points throughout the length thereof.

The outlet end of chamber 23 and the inlet end of chamber 27 are each provided with a slide plate 52 and 53, respectively; the plate 52 being controlled by the hand operated screw-rod 54, while the plate 53 is controlled by a similar screw-rod 55. Plate 52 controls the discharge from chamber 23; while plate 53 controls the admission of the cheese into chamber 27. The connection conduit 30 in advance of its connection with chamber 26 and therefore slightly in advance of the slide plate 53 is provided with a thermostat at 56 (having operative relation with a suitable valve in the steam line) whereby the admission of steam into chamber 27 is controlled by the temperature within the connection 30 and therefore the temperature of the cheese mass passing therethrough. 57 is a steam line for delivering steam to steam line 46 whereby steam is delivered by means of the branches 48 into chamber 27; and this line 57 is provided with a by-pass 58 having a hand controlled valve at 59 permitting manual control of the steam. An automatic valve 60, regulated by a regulator 61, is controlled by a thermostat-bulb 62. This thermostat-bulb enters the discharge end 63 leading from chamber 27; the thermostat-bulb 62 controlling regulator 61 which in turn controls the valve 60 for automatically controlling the steam admitted into chamber 27; 64 constituting the air line to operate regulator 61.

The steam lines at suitable points are provided with traps as at 65 having drips 66 for discharging the condensate from the lines, in order that more or less dry steam may be introduced into the chambers. Steam is also introduced by means of jet 67 located at the delivery end of the cheese grinding chamber 16, into the cheese discharging from chamber 16 into the initial or charging end of chamber 23.

As previously stated, the grinder and compressor portion of the machine, namely the portion indicated at 16, is preferably in the nature of a double trough as shown in Figure 8, with each trough provided with its conveyor 18 for feeding the cheese toward the delivery end which communicates by means of a common connection with the upper end of the initial processing or cooking chamber 23. The grinder and compressor portion 16 is provided with a single opening 68, see Figure 4, at a central point longitudinally of the two troughs and communicating with the chute 17. The delivery ends of the two troughs of grinder portion 16 have their bottoms perforated as previously stated and these ends are provided with the perforated slide plate 20 having the laterally disposed flanges 69, 69 arranged in suitable slideways 70; the plate 20 being controlled by a rocker-shaft 71 having levers 72 and provided with the eccentric connections 73 for controlling the position of the perforated plate 20 relative to the perforated portions of the bottoms of troughs 16, so as to regulate the size of the perforations and therefore the fineness to which the cheese is to be ground before its admission into the processing portion of the machine. The ends of the double trough portion of the grinder 16 are likewise provided with the perforated end wall 74 against which is mounted the perforated plate 21, which in the present construction is slidably mounted so that the perforations of plate 21 may be made to entirely or partially register with the perforated end wall 74, thereby regulating or controlling the fineness of the cheese particles.

The various processing chambers 23, 26 and 27 are intended to be closed throughout their entire length, except for the receiving end of chamber 23 which communicates with the discharge end of the grinder portion 16, in order that the cheese may be processed or cooked by the steam introduced into said chambers. In order, however, to prevent excessive pressure being created in the chambers and to prevent the creation of what may be termed steam pockets, the machine at suitable points, for example the connection 28 between the delivery end of chamber 23 and the initial or receiving end of chamber 26 is shown provided with a safety vent in the form of a downwardly curved tube 75, see Figures 1 and 5, which is shown fitted into a plate 76 mounted in the flange 77 surrounding the opening 78 in the connection 28. In the event of too great a pressure being obtained, the excess pressure may find relief or "blow off" through tube 75. During such "blow off" action certain of the cheese will also pass through the tube, but the moment the pressure is relieved, the cheese will seal tube 75 against the improper escape of steam as soon as the pressure drops below the excessive degree.

The admission of steam to chamber 26 is automatically controlled by means of a regulator 79, see Figure 1, which controls valve 80, thereby controlling the steam admitted by line 45.

The initial end of the machine is provided with a container 81 adapted to contain salt or any other suitable ingredient; the container being provided with suitable feed mechanism for introducing predetermined portions of the salt by means of the chute 82 into the cheese as it is being fed from the tray 15 into chute 17. The salt container 81 and its feeding mechanism is of well known construction provided with suitable control mechanism and detailed illustration and description need not be made. This salt feeder is operated by the driving mechanism consisting of a silent chain as at 83 mounted on a sprocket 84, operatively connected to gear 85 by means of suitable clutch mechanism shown at 86. The gear 85 is in mesh with a gear 87 mounted on the shaft 18ª controlling feed screw 18.

The steam connection between steam supply line 41 and the steam line 45 for admitting steam into chamber 26, also involves a by-pass at 88 having manually operated valve 89, whereby steam may be admitted to chamber 26, when valve 90 is closed; valve 90 being located in advance of the automatically controlled regulating valve 80.

It will be understood that regulator 79 is provided with the thermostat-bulb 56 which is arranged in the connection 30 between chambers 26 and 27, see Figure 6, whereby the temperature of the cheese mass in chambers 26 is controlled.

As certain cheeses to be processed may be in an extremely dry state, we provide a container 91 provided with a suitable spigot 92, adapted, when opened, to discharge a suitable fluid into the housing 22 arranged about the open end of chamber 23.

In operation, the previously broken up cheese is conveyed to the receiving tray or table 15 and introduced through chute 17 into grinder chamber or double trough 16 and by means of the screws 18 forced through the perforated ends; the perforated plates having been previously regulated to provide the desired fineness of cheese particles. The finely ground cheese thence passes into the first cooking or processing chamber 23 into which the steam has been allowed to flow through proper setting of the valves in the steam line. Before the admission of the cheese into chamber 23, however, slide plate 52 at the delivery end of chamber 23 is closed and kept so until chamber 23 has been completely filled. As soon as chamber 23 has been filled sufficiently with cheese and after slide-plate 53 at the initial end of chamber 27 has been moved to closed position, slide-plate 52 is moved to open position through proper operation of screw-rod 54. The cheese mass, in its initial state of processing, is then allowed to flow into chamber 26, being forced thereinto by the worm-screw 24 in chamber 23. Slide-plate 53 is kept closed until chamber 26 and connection 30 are sufficiently filled with cheese, as well as initial chamber 23, after which, slide-plate 53 is opened to allow the cheese mass to flow into chamber 27; being forced thereinto by the pressure of worm-screw 29 in chamber 26, as well as through the pressure created by worm-screw 24 in chamber 23. It will be understood that slide-plates 52 and 53 are regulated to provide openings for the discharge of the cheese-mass commensurate with the rate of cheese fed from the grinder and compressor portion 16, in order that the chambers 23, 26 and 27 will be kept practically filled during the processing operation; the cheese mass traveling through chamber 23 toward the right in Figure 1; thence rearward or to the left in chamber 26 and finally toward the right through chamber 27.

During the charging period, the outlet 63 of chamber 27 is closed by a suitable gate or slide-plate shown at 93 in Figure 1; the discharge 63 being kept closed until chamber 27, like chambers 26 and 23, is filled; the opening of plate 93 being preferably such that the rate of discharge is commensurate with the speed of charging chamber 23. The fully processed cheese mass is then allowed to flow from discharge 63 into any suitable receptacles. The temperature in the various chambers 23, 26 and 27 increases to the desired predetermined degree in chamber 27; it being quite essential to maintain the correct temperature as a variation in temperature either way would affect the character or quality of the cheese; a better quality and flavor being obtained by maintaining the proper temperature which is accurately controlled by the thermostatically controlled valves.

In carrying out the processing of cheese as contemplated by applicants' machine, it has been found advisable to employ a plurality of separate cooking chambers in order to prevent the creation of too great a pressure which would result in a single chamber of length sufficient to cook the cheese and which pressure would result in an inferior quality of cheese in which the grain would be broken down. With our improved machine, the separate chambers permit of accurate control of the pressure and temperature in the respective chambers, with the result that a superior quality of processed cheese is produced.

The invention has been exemplified in what is believed to be its best embodiment and has been described in terms which are employed merely as terms of description and not as terms of limitation, as structural modifications are possible and may be made without, however, departing from the spirit of our invention.

What we claim is:

1. A continuous cheese processing machine comprising a cooking zone composed of a plurality of elongated closed receptacles arranged in communication with each other at the ends, conveyor means arranged lengthwise within each receptacle, all of said conveyor means being operatively connected to operate simultaneously at uniform speed, closure means for controlling communication between the ends of the receptacles, a plurality of controllable steam nozzles arranged throughout the lengths of said receptacles for introducing steam into the cheese mass while it is traveling through each receptacle, and automatic means intermediate of the receptacle interior and the steam lines whereby the inflow of steam may be controlled by the temperature within the receptacle.

2. A continuous cheese processing machine comprising a cooking zone composed of a plurality of parallelly arranged elongated closed receptacles arranged in communication with each other at the ends, steam introducing nozzles arranged throughout the lengths of said receptacles, means intermediate of the receptacle interiors and the steam lines for said nozzles whereby the steam discharged by the nozzles will be controlled by the temperature within the receptacles, conveyor means rotatably mounted in each receptacle for continuously moving the cheese mass, means whereby all of said means are simultaneously actuated at uniform speed, in combination with cheese comminuting means arranged to continuously feed the comminuted cheese into the receiving end of the initial cooking receptacle.

3. A continuous cheese processing machine comprising a closed elongated cooking zone through which the cheese is made to travel continuously, conveyor means disposed lengthwise of said zone, a steam supply provided with a plurality of nozzles for introducing steam throughout the length of said zone, automatic means intermediate of the steam supply and the cooking zone whereby inflow of steam is controlled by the temperature of the zone, and automatically operable means for releasing excess pressure in the cooking zone, said means being sealed against steam discharge by the cheese mass traveling through said zone.

4. A continuous cheese processing machine provided with a plurality of elongated passages constituting a cheese comminuting zone and cheese cooking zone arranged in communication to permit continuous travel of the cheese mass, means for introducing jets of steam into the cheese mass at the delivery end of the comminuting zone and throughout the lengths of the cooking zone, means arranged at predetermined points in the cooking zone whereby the steam introduced is controlled by the temperature of the cheese mass, revolving conveyors disposed throughout all of said passages, means whereby said conveyors are simultaneously rotated at uniform speed, and means controllable from the machine exterior for controlling the communication between the respective passages of the cooking zone.

5. A continuous cheese processing machine comprising a comminuting zone and a cooking zone, said zones consisting of elongated receptacles arranged in communication with each other at the ends, the cooking zone consisting of a plurality of parallelly arranged receptacles closed to atmosphere except at the point of communication between the delivery end of the comminuting zone and the receiving end of the cooking zone, revolving conveyors arranged lengthwise of all of said receptacles whereby the cheese is made to travel continuously, means for actuating said conveyors simultaneously at uniform speed, means whereby steam is introduced at the point of communication between the comminuting zone and the cooking zone and at spaced points throughout the receptacles of the cooking zone, means for releasing excess pressure in the cooking zone, and automatic means for controlling the introduction of steam into the cooking zone by the temperature of the cheese mass therein.

6. In a continuous cheese processing machine, a cooking zone composed of a plurality of elongated closed receptacles arranged in communication at the ends, means operable from the machine exterior for controlling the moment and degree of communication between the successive receptacles, revolving conveyors arranged lengthwise of all of said receptacles and arranged to rotate at uniform speed, means whereby steam is introduced at spaced points throughout the lengths of said receptacles, means, sealable by the cheese mass passing through the receptacles, for releasing excess pressure in the cooking zone, and automatic means for regulating the steam introduction, controllable by the temperature of the cheese mass.

7. In a continuous cheese processing machine, a plurality of elongated passages constituting a cooking zone, said passages being arranged in parallel relation, conduits for establishing communication between the ends of the respective passages, slide-plates adjacent to the ends of the conduits and controllable from the machine exterior for regulating the moment and extent of communication between said passages, a revolvable conveyor disposed lengthwise of each passage whereby the cheese is made to travel continuously from the charging end of one passage to the delivery end of the last passage, means for introducing steam at a plurality of points throughout all of said passages, and pressure release means at an intermediate point in the cooking zone.

8. In a continuous cheese processing machine, a plurality of elongated passages constituting a cooking zone, said passages being arranged in parallel relation, connections intermediate of an end of each passage for establishing communication between the passages, slide-plates at said connections, controllable from the machine exterior for regulating the communication, a revolvable conveyor disposed lengthwise of each passage whereby the cheese is made to travel continuously throughout said zone, steam injecting means arranged at a plurality of points throughout all of said passages, automatic means controlled by the temperature of the cheese passing through the zone for controlling the steam injection, and means for relieving excess pressure in the cooking zone and controlled by the cheese mass.

9. A continuous cheese processing machine comprising a plurality of elongated receptacles arranged in communication with each other, said receptacles being closed to atmosphere except at the charging end of the initial receptacle, hinged tops for the receptacles, means whereby said tops are clamped in closed position, an agitating conveyor revolubly mounted in each receptacle and extending from end to end thereof, means for injecting steam into all of said receptacles at a plurality of points throughout the lengths thereof, and pressure relief means intermediate of the charging end and the discharging end of the machine, said means being sealable by the cheese when excess pressure is reduced.

CHARLES DOERING.
HENRY H. DOERING.